US011285967B2

(12) United States Patent
Williams

(10) Patent No.: US 11,285,967 B2
(45) Date of Patent: Mar. 29, 2022

(54) SYSTEM AND METHOD FOR MODIFYING ACTIONS TAKEN BY AN AUTONOMOUS VEHICLE

(71) Applicant: Toyota Motor Engineering & Manufacturing North America, Inc., Plano, TX (US)

(72) Inventor: Paxton S. Williams, Milan, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 16/790,131

(22) Filed: Feb. 13, 2020

(65) Prior Publication Data

US 2021/0253129 A1    Aug. 19, 2021

(51) Int. Cl.
*B60W 60/00* (2020.01)
*G06K 9/00* (2006.01)
*B60W 40/08* (2012.01)

(52) U.S. Cl.
CPC ........ *B60W 60/0013* (2020.02); *B60W 40/08* (2013.01); *B60W 60/0018* (2020.02); *B60W 60/0025* (2020.02); *G06K 9/00791* (2013.01)

(58) Field of Classification Search
CPC ............. B60W 60/0013; B60W 40/08; B60W 60/0025; B60W 60/0018; G06K 9/00791
See application file for complete search history.

(56) References Cited

U.S. PATENT DOCUMENTS

| 8,866,604 | B2 | 10/2014 | Rankin et al. |
| 10,189,434 | B1 | 1/2019 | Casaburo et al. |
| 10,266,182 | B2 | 4/2019 | Krishnan et al. |
| 10,984,543 | B1* | 4/2021 | Srinivasan ................ G06T 7/70 |
| 2014/0039987 | A1* | 2/2014 | Nerayoff ................ G08G 1/056 705/13 |
| 2016/0378112 | A1* | 12/2016 | Ljubuncic .......... G06K 9/00845 701/45 |

(Continued)

FOREIGN PATENT DOCUMENTS

WO    2018178844 A1    10/2018

*Primary Examiner* — James J Lee
*Assistant Examiner* — Alexander George Matta
(74) *Attorney, Agent, or Firm* — Christopher G. Darrow; Darrow Mustafa PC

(57) ABSTRACT

A system for modifying actions taken by an autonomous driving module of an autonomous vehicle may include one or more processors, an input device having an actuator, and a memory having an input module and a modification module. The input module includes instructions that, when executed by the one or more processors, cause the one or more processors to determine when the actuator of the input device is actuated by a passenger of the autonomous vehicle when the autonomous driving module is in an autonomous mode. The modification module includes instructions that, when executed by the one or more processors, cause the one or more processors to modify one or more actions to be performed by the autonomous driving module while maintaining the autonomous mode of the autonomous driving module when the actuator of the input device is actuated by the passenger. The one or more actions may include increasing an amount of sensor data considered by the autonomous driving module.

20 Claims, 5 Drawing Sheets

(56) References Cited

U.S. PATENT DOCUMENTS

| | | |
|---|---|---|
| 2017/0369052 A1 | 12/2017 | Nagy et al. |
| 2018/0079427 A1 | 3/2018 | Herz et al. |
| 2018/0136000 A1* | 5/2018 | Rasmusson, Jr. .... G06K 9/6267 |
| 2018/0188726 A1 | 7/2018 | Newman |
| 2018/0281815 A1* | 10/2018 | Stentz ................. G08G 1/0129 |
| 2019/0171215 A1* | 6/2019 | Tatourian ............. G05D 1/0088 |
| 2020/0004332 A1* | 1/2020 | Jeon ................... G06K 9/00671 |
| 2021/0116913 A1* | 4/2021 | Dingli ................. G05D 1/0214 |

* cited by examiner

SYSTEM AND METHOD FOR MODIFYING ACTIONS TAKEN BY AN AUTONOMOUS VEHICLE

TECHNICAL FIELD

The subject matter described herein relates, in general, to systems and methods for modifying actions taken by an autonomous vehicle.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles have multiple levels of autonomy ranging from completely non-autonomous to full autonomy, where input from the passenger of the vehicle is generally not required. Autonomous vehicles may use one or more sensors, map databases, and other information so as to operate the vehicle in a relatively safe manner and avoid any collisions with pedestrians, other vehicles, fixed objects, and the like.

However, there are some situations where a passenger may feel more comfortable with taking over control of the autonomous vehicle. As such, some of these fully autonomous vehicles also include traditional control inputs, such as steering wheels, accelerator pedals, brake pedals, and the like for controlling the vehicle if the vehicles in a non-autonomous mode. The passenger of the vehicle can, by one way or another, change the mode of the autonomous vehicle from an autonomous mode to either a semi-autonomous or non-autonomous mode, wherein the passenger takes control of the vehicle and actuates the steering wheel, pedals, and other controls to pilot the vehicle.

SUMMARY

This section generally summarizes the disclosure and is not a comprehensive explanation of its full scope or all its features.

In one embodiment, a system for modifying actions taken by an autonomous driving module of an autonomous vehicle may include one or more processors, an input device having an actuator, and a memory having an input module and a modification module. The input module includes instructions that, when executed by the one or more processors, cause the one or more processors to determine when the actuator of the input device is actuated by a passenger of the autonomous vehicle when the autonomous driving module is in an autonomous mode. The modification module includes instructions that, when executed by the one or more processors, cause the one or more processors to modify one or more actions to be performed by the autonomous driving module while maintaining the autonomous mode of the autonomous driving module when the actuator of the input device is actuated by the passenger. The one or more actions may include increasing an amount of sensor data considered by the autonomous driving module.

In another embodiment, a method for modifying actions taken by an autonomous driving module of an autonomous vehicle includes the steps of determining when an actuator of an input device is actuated by a passenger of the autonomous vehicle when the autonomous driving module is in an autonomous mode and modifying one or more actions to be performed by the autonomous driving module while maintaining the autonomous mode of the autonomous driving module when the actuator of the input device is actuated by the passenger. The one or more actions may include increasing an amount of sensor data considered by the autonomous driving module.

In yet another embodiment, a non-transitory computer-readable medium for modifying actions taken by an autonomous driving module of an autonomous vehicle includes instructions that when executed by one or more processors cause the one or more processors to determine when an actuator of an input device is actuated by a passenger of the autonomous vehicle when the autonomous driving module is in an autonomous mode, and modify one or more actions to be performed by the autonomous driving module while maintaining the autonomous mode of the autonomous driving module when the actuator of the input device is actuated by the passenger. The one or more actions may include increasing an amount of sensor data considered by the autonomous driving module.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for modifying one or more actions taken by an autonomous driving module of an autonomous vehicle while maintaining the level of autonomy of the autonomous vehicle. The system may be mounted within an autonomous vehicle and may include an input device that has an actuator. When a passenger of the autonomous vehicle detects a situation that may be unsafe and would like the autonomous driving module of the autonomous vehicle to proceed more cautiously, the passenger can actuate the actuator of the input device. Upon actuation by the passenger, the system modifies one or more actions to be taken by the autonomous driving module of the autonomous vehicle. These actions could include actions such as increasing the amount of sensor data considered by the autonomous control module, reducing the rate of acceleration determined by the autonomous control module, reducing the velocity of the autonomous vehicle, and the like. The actions modified by the system may not change the level of autonomy of the autonomous vehicle.

Figure 1:
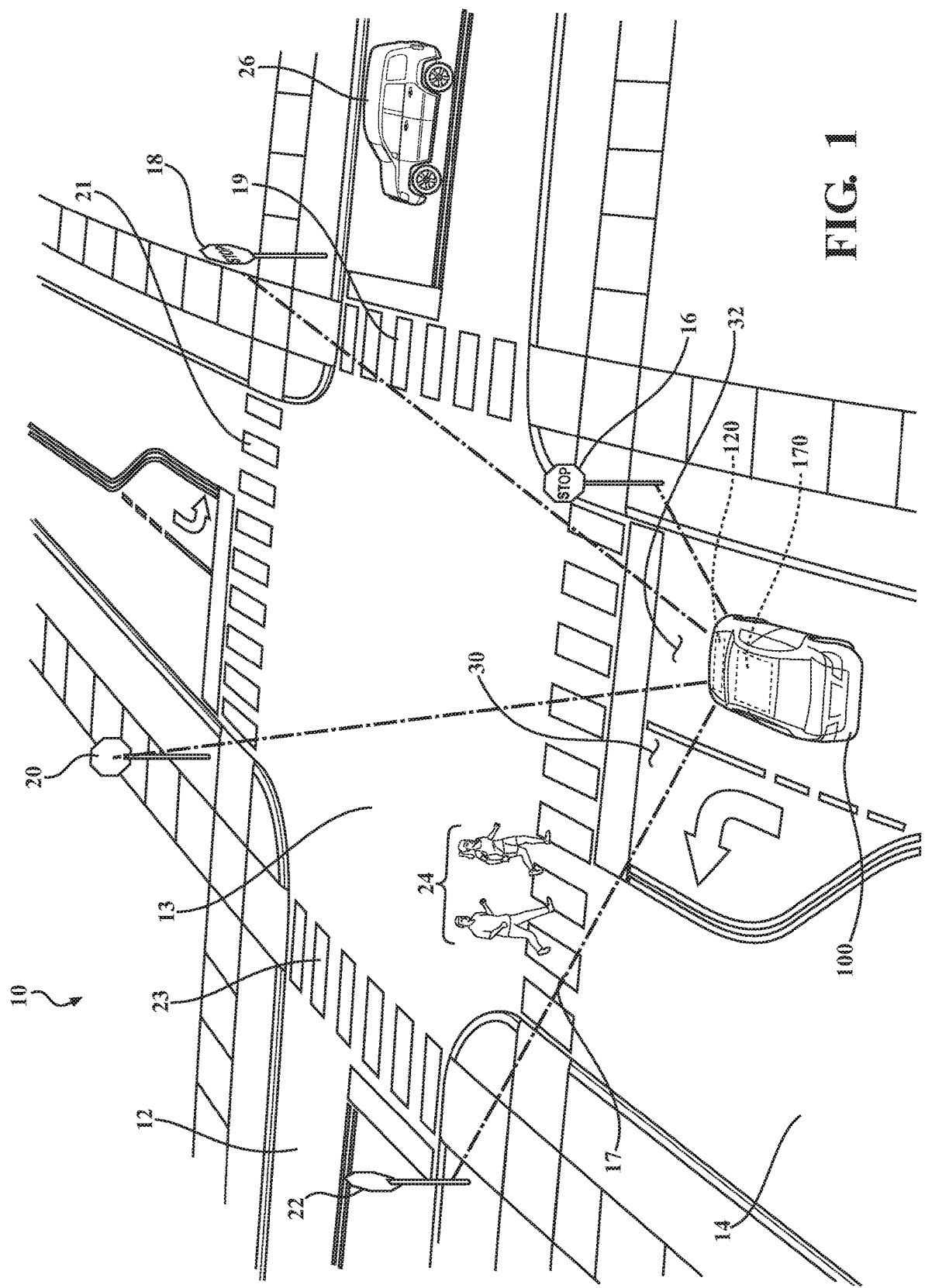
FIG. 1 illustrates an example scenario of the operation of a system for modifying actions taken by an autonomous driving module of an autonomous vehicle.

Referring to FIG. 1, a scenario 10 for explaining the system and method for modifying one or more actions of an autonomous driving module of an autonomous vehicle is shown. It should be understood that the scenario 10 is provided to explain the features of the system and method. The scenario 10 can vary significantly from one scenario to another and that the example scenario is just one example.

The scenario 10 illustrates a road 12 and a road 14 that crisscross each other and form an intersection 13. At the intersection 13 are stop signs 16, 18, 20, and 22. As such, the intersection 13 is an intersection that has a four-way stop, wherein all vehicles approaching the intersection 13 are required to stop before entering the intersection.

In addition to the intersection 13 being a four-way stop, the intersection also includes four crosswalks 17, 19, 21, and 23. The crosswalks 17, 19, 21, and 23 may be utilized by pedestrians and/or non-motorized vehicles to cross the roads 12 and 14 safely. As such, the vehicles approaching the intersection 13 are required to stop at the intersection 13. Pedestrians crossing the roads 12 and/or 14 by utilizing the crosswalks 17, 19, 21 and 23 have the right of way and can safely cross the roads 12 and/or 14.

Also illustrated in this scenario 10 is a vehicle 100 that may be an autonomous vehicle and is located on the road 14. In this scenario, the vehicle 100 has stopped at the intersection 13 and pedestrians 24 are crossing the road 14 by utilizing the crosswalks 17. The vehicle 100 can have multiple modes of autonomy, such as the levels defined by the Society of Automotive Engineers (SAE) (e.g., levels 0-5). However, the vehicle 100 may have at least one mode of autonomy wherein the vehicle is able to pilot itself with limited and/or no intervention from a passenger of the vehicle 100. In this example, the vehicle 100 also includes the system for modifying actions to be performed by the autonomous driving module, which functions to control the movement of the vehicle 100. The vehicle 100 may also include a sensor system 120 that can detect objects, such as pedestrians, vehicles, buildings, or other environmental features external to the vehicle 100.

As will be explained in greater detail later in this description, the modifying system 170 is capable of receiving input from a passenger of the vehicle 100 that essentially informs the modifying system 170 that the passenger of the vehicle 100 wants the autonomous driving module of the vehicle 100 to proceed more cautiously. Essentially, the passenger of the vehicle 100 may have determined that an unsafe situation has arisen or is likely to arise and desires that the autonomous driving module of the vehicle 100 exuded greater caution in making decisions to avoid a collision or some other unfortunate scenario.

In one example, the passenger of the vehicle 100 may actuate an actuator of an input device to indicate that the autonomous driving module of the vehicle 100 should exude greater caution. Moreover, the passenger of the vehicle 100 may have determined that the vehicle should be extremely mindful of the pedestrians 24 that are crossing in front of the vehicle 100. After actuating the modifying system 170, the modifying system 170 may modify actions taken by the autonomous driving module of the vehicle 100. These actions can include such things as increasing the amount of sensor data considered by the autonomous control module, reducing the rate of acceleration that the autonomous driving module will utilize when piloting the vehicle 100, reducing the velocity of the vehicle 100, changing the steering angle of the vehicle 100, and the like. By so doing, the passenger of the vehicle 100 can be more confident in the actions taken by the autonomous driving module of the vehicle 100 and/or the autonomous driving module of the vehicle 100 can proceed more cautiously to avoid any collisions or other unfortunate outcomes.

In another example, the scenario 10 also includes a rapidly approaching vehicle 26 that is on the road 12. In this example, the vehicle 26 is rapidly approaching the intersection 13. The passenger may determine that the rapidly approaching vehicle 26 may not know and/or is unlikely to stop at the intersection 13. Like before, the passenger of the vehicle 100 may actuate an actuator of the system 170 to modify actions taken by the autonomous driving module of the vehicle 100. Like before, the autonomous driving module may consider additional sensor data, reduce the rate of acceleration, reduce the velocity, change the steering wheel angle, and the like.

Further, as will be explained in greater detail later in this description, the system 170 may have the ability to receive a directional input from the passenger of the vehicle 100. For example, the passenger of the vehicle 100 may have a pointing device, like a touchpad, joystick, and the like that allows the passenger to provide a direction of the perceived danger from the viewpoint of the passenger. In one example, the passenger could indicate that the perceived danger is from the pedestrians 24 and/or the rapidly approaching vehicle 26. In such an example, the modifying system 170 could increase the amount of sensor data from the directions indicated by the passenger of the vehicle 100. For example, if the passenger the vehicle 100 indicates that the pedestrians 24 may be a danger, the modifying system 170 could increase the amount of sensor data from the field-of-view 30 that includes the pedestrians. If the passenger of the vehicle 100 indicates that the direction of concern is towards the rapidly approaching vehicle 26, the autonomous driving module could increase the amount of sensor data considered in the field-of-view 32 that includes the rapidly approaching vehicle 26. Again, by so doing, the autonomous driving module of the vehicle 100 can increase the amount of data and make better choices regarding how to pilot the vehicle 100.

It should be understood that the system 170 may not be a "kill switch" that essentially either changes the mode of autonomy of the vehicle to one where the passenger must drive the vehicle or stop the vehicle altogether. The system 170 essentially modifies some behaviors taken by the autonomous driving module of the vehicle 100, while maintaining the same level of autonomy of the vehicle 100.

Figure 2:
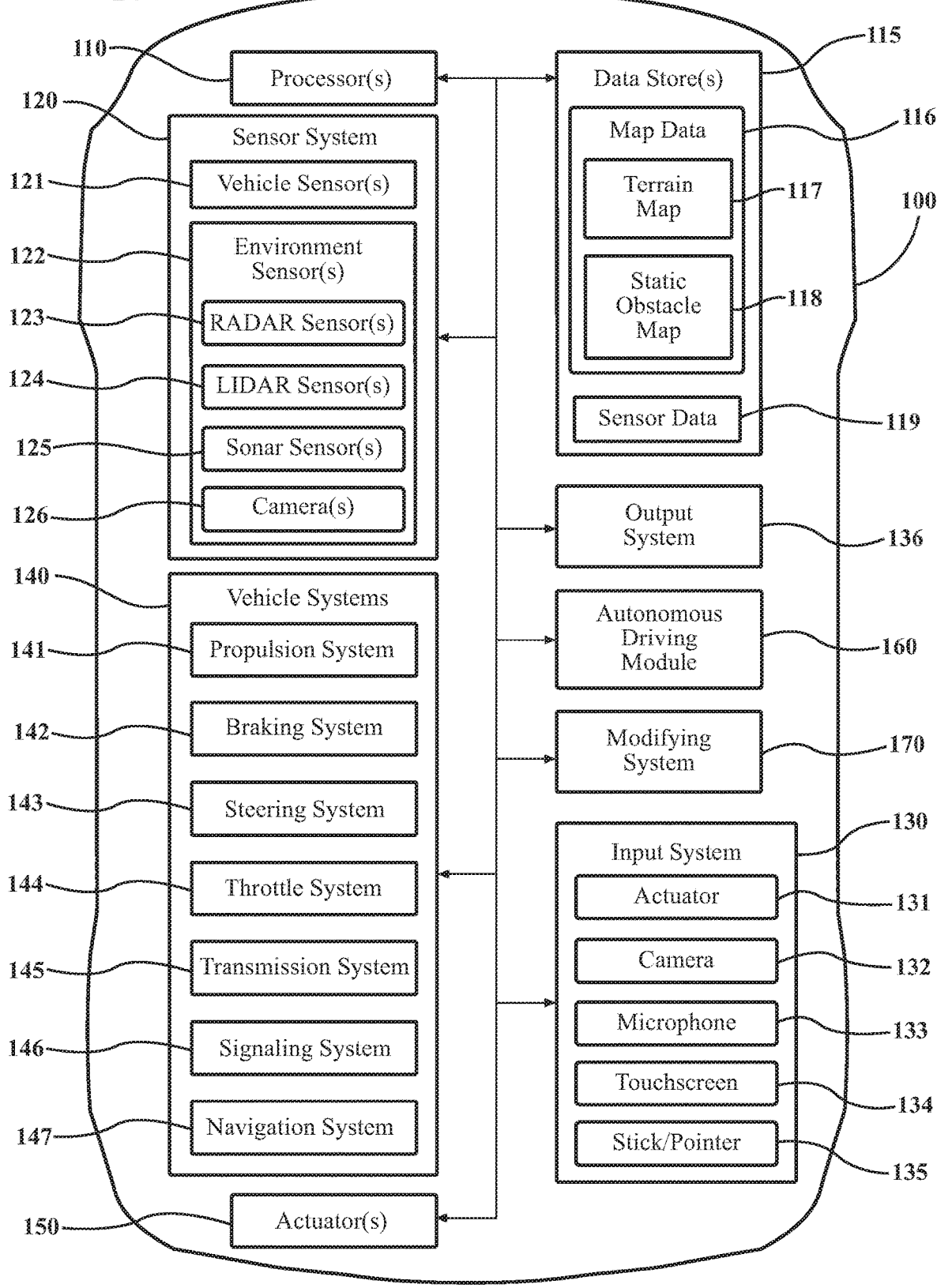
FIG. 2 illustrates a vehicle incorporating the system for modifying actions taken by the autonomous driving module.

Referring to FIG. 2, an example of the vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, includes one or more automated or autonomous systems, and thus benefits from the functionality discussed herein.

In various embodiments, the automated/autonomous systems or combination of systems may vary. For example, in one aspect, the automated system is a system that provides autonomous control of the vehicle according to one or more levels of automation, such as the levels defined by the Society of Automotive Engineers (SAE) (e.g., levels 0-5). As such, the autonomous system may provide semi-autonomous control or fully autonomous control, as discussed in relation to the autonomous driving module 160.

The vehicle 100 also includes various elements. It will be understood that in various embodiments it may not be necessary for the vehicle 100 to have all of the elements shown in FIG. 2. The vehicle 100 can have any combination of the various elements shown in FIG. 2. Further, the vehicle 100 can have additional elements to those shown in FIG. 2. In some arrangements, the vehicle 100 may be implemented without one or more of the elements shown in FIG. 2. While the various elements are shown as being located within the vehicle 100 in FIG. 2, it will be understood that one or more of these elements can be located external to the vehicle 100. Further, the elements shown may be physically separated by large distances and provided as remote services (e.g., cloud-computing services).

Some of the possible elements of the vehicle 100 are shown in FIG. 2 and will be described along with subsequent figures. However, a description of many of the elements in FIG. 2 will be provided after the discussion of FIGS. 3-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. It should be understood that the embodiments described herein may be practiced using various combinations of these elements.

In either case, the vehicle 100 includes a modifying system 170. The modifying system 170 may be incorporated within the autonomous driving module 160 or may be separate, as shown. The modifying system 170 may be able to receive an input from a passenger of the vehicle 100 via actuator of an input device and, in response to receiving the input, modify one or more actions performed by the autonomous driving module 160. As stated previously, the passenger may actuate the input device when the passenger perceives some danger and wants the autonomous driving module 160 to proceed more cautiously, while maintaining the level of autonomy of the autonomous driving module 160 of the vehicle 100.

The vehicle 100 can include one or more input device(s) 130. An "input device" includes any device, component, system, element, or arrangement or groups thereof that enable information/data to be entered into a machine. The input device(s) 130 can receive an input from a vehicle passenger (e.g., a driver or a passenger). The vehicle 100 can include an output system 136. An "output system" includes any device, component, or arrangement or groups thereof that enable information/data to be presented to a vehicle passenger (e.g., a person, a vehicle passenger, etc.).

The input device(s) 130 may include any one of a number of different input devices. In one example, the input device(s) 130 includes an actuator 131 that may be configured to be actuated by a passenger of the vehicle 100 they want the autonomous driving module 160 to proceed more cautiously. The actuator 131 could be a physical button, switch, toggle, and the like, but could also be an electronic input device, such as a touchscreen, soft-touch button, and the like. As such, it should be understood that the actuator 131 could take any one of a number of different forms, not necessarily those specifically enumerated above. In any event, the actuator 131 should be able to receive some type of physical input from a passenger of the vehicle 100.

The input device(s) 130 could also include other types of input devices. For example, the input device(s) 130 could include a camera that is capable of capturing images that may include one or more gestures performed by the passenger of the vehicle 100. In one example, instead of actuating an actuator 131, the passenger may gesture in such a way that the camera 132 captures images and these images indicate that the modifying system 170 should modify one or more actions performed by the autonomous driving module 160.

The input device(s) 130 may also include a microphone 133 is an input device. The microphone may be able to receive audible input from the passenger of the vehicle 100 regarding actuation of the modifying system 170 and/or other information, such as identifying an object type and/or direction of the perceived danger by the passenger.

The input device(s) 130 could also include a touchscreen 134 and/or an analog pointing device 135, which could be a joystick, mouse, or rotatable dial that can indicate the overall direction of a perceived danger by the passenger of the vehicle 100. As described in the scenario 10 of FIG. 1, the passenger may be able to indicate the direction of the pedestrians 24 and/or the rapidly approaching vehicle 26. By so doing, the modifying system 170 can instruct the autonomous driving module 160 to utilize additional sensor data collected by the sensor system 120 of the vehicle 100.

Figure 3:
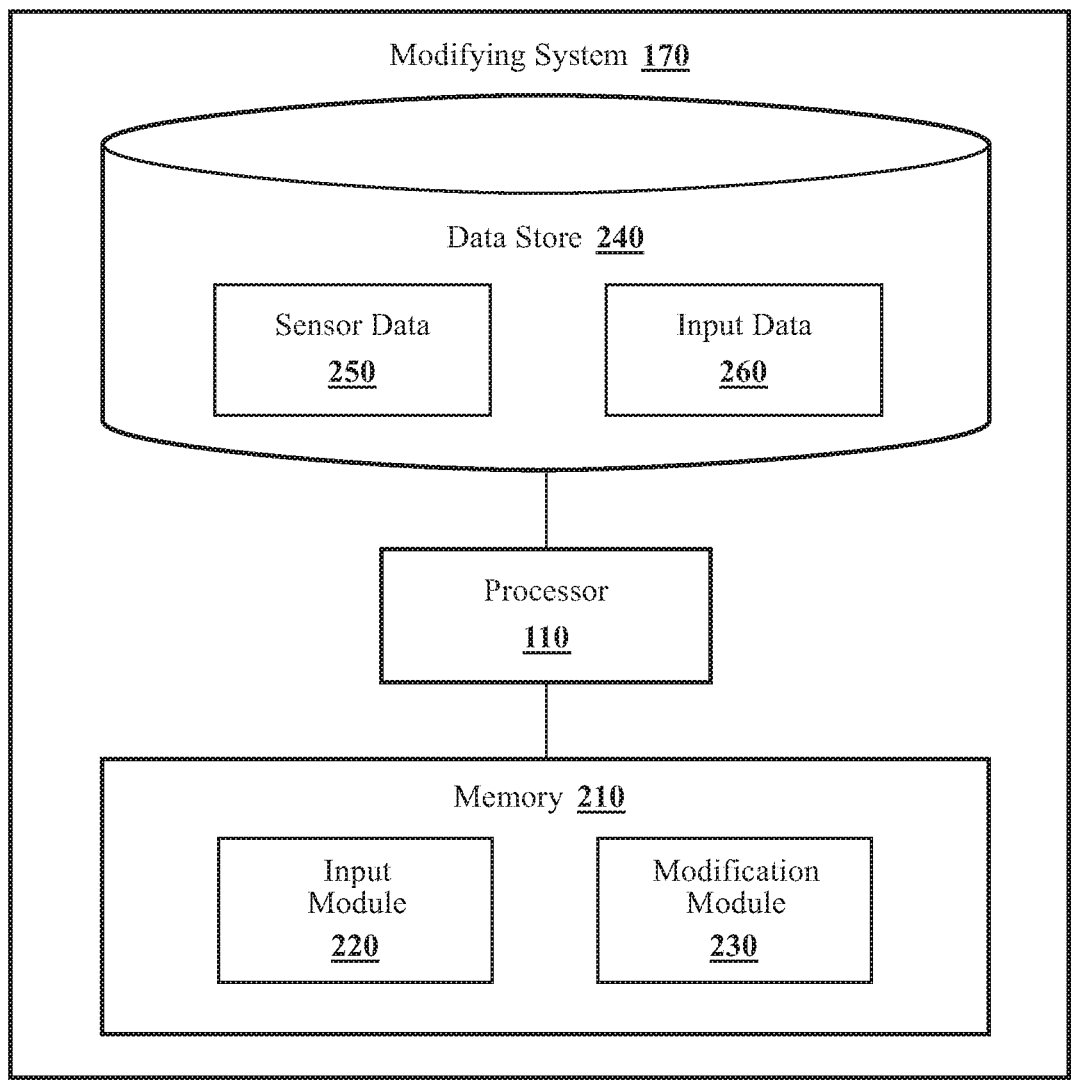
FIG. 3 illustrates a more detailed block diagram of the system for modifying actions taken by the autonomous driving module.

With reference to FIG. 3, one embodiment of the modifying system 170 is further illustrated. As shown, the modifying system 170 includes a processor(s) 110. Accordingly, the processor(s) 110 may be a part of the modifying system 170, or the modifying system 170 may access the processor(s) 110 through a data bus or another communication path. In one or more embodiments, the processor(s) 110 is an application-specific integrated circuit that is configured to implement functions associated with an input module 220 and/or a modification module 230. In general, the processor(s) 110 is an electronic processor such as a microprocessor that is capable of performing various functions as described herein. In one embodiment, the modifying system 170 includes a memory 210 that stores the input module 220 and/or the modification module 230. The memory 210 is a random-access memory (RAM), read-only memory (ROM), a hard disk drive, a flash memory, or other suitable memory for storing the modules 220 and 230. The modules 220 and 230 are, for example, computer-readable instructions that, when executed by the processor(s) 110, cause the processor(s) 110 to perform the various functions disclosed herein.

Furthermore, in one embodiment, the modifying system 170 includes a data store 240. The data store 240 is, in one embodiment, an electronic data structure such as a database that is stored in the memory 210 or another memory and that is configured with routines that can be executed by the processor(s) 110 for analyzing stored data, providing stored data, organizing stored data, and so on. Thus, in one embodiment, the data store 240 stores data used by the modules 220 and 230 in executing various functions. In one embodiment, the data store 240 includes sensor data 250 collected from the sensor system 120 and/or input data 260 collected from the input device(s) 130, along with, for example, other information that is used by the modules 220 and 230.

Accordingly, the input module 220 generally includes instructions that function to control the processor(s) 110 to determine, in one example, when a passenger of the vehicle 100 actuates the actuator 131 of the input device 130 when the autonomous driving module 160 is in an autonomous mode. Other examples could include the actuation of any of the other devices 131-135 of the input device(s) 130. As stated before, the actuation of one of the input devices 131-135 of the input device(s) 130 may generally be performed when the passenger of the vehicle 100 has determined that the autonomous driving module 160 should proceed with enhanced caution, while maintaining the level of autonomy of the autonomous driving module 160.

The modification module 230 may include instructions that when executed by the processor(s) 110 cause the processor(s) 110 to modify one or more actions to be performed by the autonomous driving module 160 while maintaining the autonomous mode of the autonomous driving module 160 when the actuator 131 of the input device(s) 130 is actuated by the passenger. The actions modified that are to be performed by the autonomous driving module 160 can include any one of a number of different actions that allow the vehicle 100 to proceed with greater caution. In one example, these actions could include increasing an amount of sensor data considered by the autonomous driving module 160, reducing a current or future rate of acceleration of the vehicle 100, reducing a current or velocity of the vehicle 100, and/or changing the steering angle of the vehicle 100.

In another example, the input module 220 may include instructions that cause the processor(s) 110 to receive, via the input device(s) 130, a direction from the passenger of the vehicle 100. The direction indicated by the passenger of the vehicle 100 may be a direction from the point of view of the passenger of potential danger or some other concern the passenger may have. For example, as previously described in FIG. 1, the direction could include the direction of pedestrians 24 as they cross in front of the vehicle 100, the direction of a speeding vehicle 26 that does not appear to be stopping at the stop sign 18, or any other type of danger a concern determined by the passenger.

The direction can be input by the passenger utilizing any of the input device(s) 130. In one example, the passenger may gesture to the camera 132 and the processor(s) 110 may be able to determine, based on the gesture provided by the passenger, the direction of the danger or concern. The passenger may utilize a microphone 133 to describe the overall direction of the danger or concern. In yet another example, the passenger may utilize a touchscreen 134 or analog pointing device 135 to provide some indication of the direction of the danger or concern.

If the passenger indicates a direction, the modification module 230 may cause the processor(s) 110 to increase an amount of sensor data considered and/or collected by the sensor device(s) 120 by the autonomous driving module 160 from the direction indicated by the passenger. As such, the autonomous driving module 160 could utilize additional sensor data from the direction indicated by the passenger so as to be able to make a better and more informed decision on the appropriate action to take. For example, by utilizing additional sensor information, the autonomous driving module 160 can look for any errors and determine if there is any indication or cause of concern. Additionally, by focusing on a subset of the sensor data as indicated by the direction provided by the passenger of the vehicle 100, additional computational resources can be utilized to focus on sensor data from the direction of concern indicated by the passenger.

In another example, the input module 220 may cause the processor(s) 110 to receive, via the input device(s) 130, an object identifier from the passenger of the vehicle 100. In one example, the object identifier may be an identifier indicating a pedestrian and a non-pedestrian. As such, for example, if the passenger of the vehicle 100 is concerned that the autonomous driving module 160 may pilot the vehicle 100 into an object, the passenger of the vehicle 100 can indicate the type of object that the passenger is concerned about. The passenger of the vehicle 100 may indicate the object identifier by using any one of the input device(s) 130. As such, the passenger could indicate by voice, touch, actuation, and the like, the object identifier.

The term pedestrian should be interpreted broadly. As such, a pedestrian could include a person who is walking, moving with the assistance of a non-vehicular device, such as a wheelchair, bicycle, skateboard, scooter, and the like. Non-pedestrians could include other vehicles, buildings, environmental features, signs, infrastructure, and the like.

Greater caution is generally practiced when the object of concern is a pedestrian, as opposed to a non-pedestrian, such as another vehicle or static object, such as a building, tree, signpost, etc. As such, the modification module 230 may cause the processor(s) 110 to modify one or more actions performed by the autonomous driving module 160 based on the object identifier. As stated before, these actions could include things such as increasing the amount of sensor data considered by the autonomous driving module 160, reducing a present or future rate of acceleration, reducing a present or future velocity of the vehicle 100, and/or changing the steering angle of the vehicle 100.

Because greater caution should be practiced when a pedestrian is indicated in the object identifier, the amount of sensor data considered by the autonomous driving module 160 may be greater when the object identifier is the pedestrian than when the object identifier is the non-pedestrian. Similarly, the future or current rate of acceleration and/or velocity of the vehicle 100 may be reduced by a greater amount by the autonomous driving module 160 when the object identifier is a pedestrian than when the object identifier is a non-pedestrian.

Figure 4:
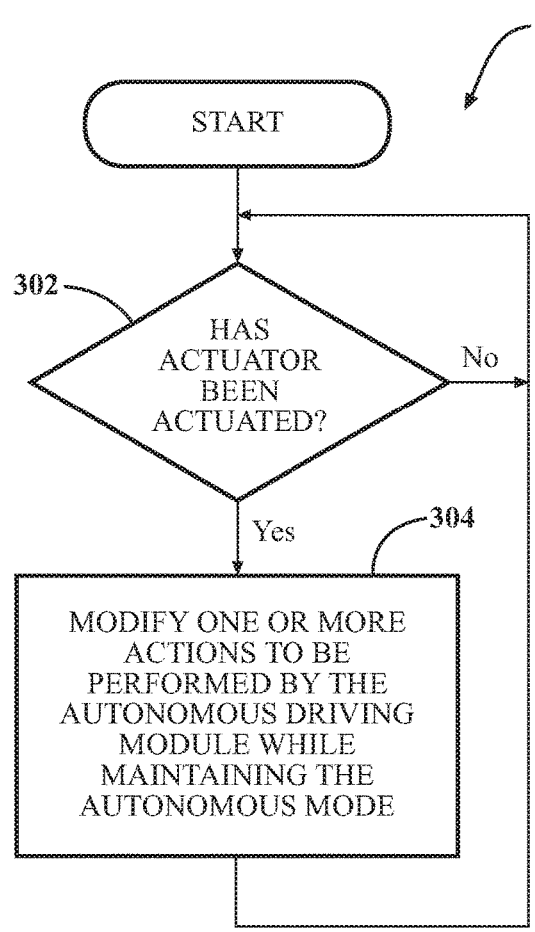
FIG. 4 illustrates one example of a method for modifying actions taken by the autonomous driving module of an autonomous vehicle.

Referring to FIG. 4, a method 300 for modifying actions taken by an autonomous driving module of an autonomous vehicle is shown. The method 300 will be described from the viewpoint of the vehicle 100 of FIG. 2 and the modifying system 170 of FIG. 3. However, it should be understood that this is just one example of implementing the method 300. While method 300 is discussed in combination with the modifying system 170, it should be appreciated that the method 300 is not limited to being implemented within the modifying system 170 but is instead one example of a system that may implement the method 300.

In step 302, the input module 220 causes the processor(s) 110 to receive and/or determine if an actuator, such as the actuator 131 of the input device(s) 130, has been actuated. As stated before, instead of the actuator 131, any one of the input device(s) 130 could be actuated instead of the actuator 131. The method 300 essentially waits until some action is performed by the passenger on the input device(s) 130. As stated before, the actuation of the actuator 131 by the passenger generally occurs when the passenger believes that the autonomous driving module 160 should proceed with extra caution as the passenger has detected a situation that may be dangerous or otherwise concerning.

Once the actuator 131 has been actuated, the method 300 proceeds to step 304. In step 304, the modification module 230 causes the processor(s) 110 to modify one or more actions to be performed by the autonomous driving module 160 while maintaining the autonomous driving mode. The actions modified that are to be performed by the autonomous driving module 160 can include any one of a number of different actions that allow the vehicle 100 to proceed with greater caution. In one example, these actions could include increasing an amount of sensor data considered by the autonomous driving module 160, reducing a current or future rate of acceleration of the vehicle 100, reducing a current or velocity of the vehicle 100, and/or changing the steering angle of the vehicle 100. Thereafter, the method may end or begin again, as shown.

Figure 5:
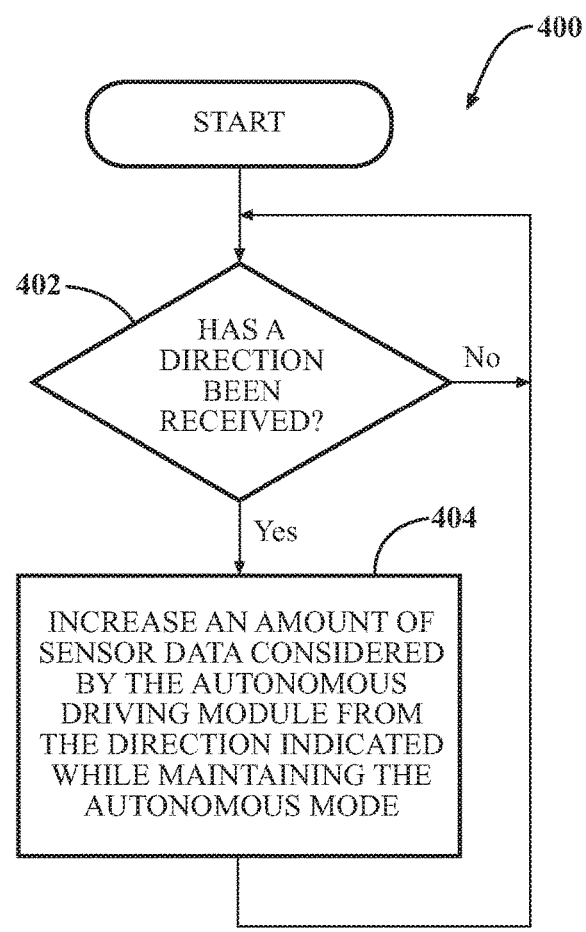
FIG. 5 illustrates another example of a method for modifying actions taken by the autonomous driving module of an autonomous vehicle using a directional input from a passenger.

Referring to FIG. 5, another method 400 for modifying actions taken by an autonomous driving module of an autonomous vehicle is shown. The method 400 will be described from the viewpoint of the vehicle 100 of FIG. 2 and the modifying system 170 of FIG. 3. However, it should be understood that this is just one example of implementing the method 400. While method 400 is discussed in combination with the modifying system 170, it should be appreciated that the method 400 is not limited to being implemented within the modifying system 170 but is instead one example of a system that may implement the method 400. Further, it should be understood that the method 400 may be combined with the method 300 previously described.

Here, the method 400 begins at step 402, wherein the input module 220 causes the processor(s) 110 to receive and/or determine a direction from the passenger of the vehicle 100. The direction indicated by the passenger of the vehicle 100 may be a direction from the point of view of the passenger of potential danger or some other concern the passenger may have. For example, as previously described in FIG. 1, the direction could include the direction of the pedestrians 24 as they walk in front of the vehicle 100, the direction of a speeding vehicle 26 that does not appear to be stopping at the stop sign 18, or any other type of danger a concern determined by the passenger.

The direction can be input by the passenger utilizing any of the input device(s) 130. In one example, the passenger may gesture to the camera 132 and the processor(s) 110 may be able to determine based on the gesture provided by the passenger the direction of the danger or concern. The passenger may utilize a microphone 133 to describe the overall direction of the danger or concern. In yet another example, the passenger may utilize a touchscreen 134 or analog pointing device 135 to provide some indication of the direction of the danger or concern.

If a direction has been received, the method 400 proceeds to step 404. In step 404, the modification module 230 causes the processor(s) 110 to increase an amount of sensor data considered and/or collected by the sensor device(s) 120 by the autonomous driving module 160 from the direction indicated by the passenger. As such, the autonomous driving module 160 could utilize additional sensor data from the direction indicated by the passenger to be able to make a better and more informed decision on the appropriate action to take. For example, by utilizing additional sensor information, the autonomous driving module 160 can look for any errors and determine if there is any indication or cause of concern. Additionally, by focusing on a subset of the sensor data is indicated by the direction provided by the passenger of the vehicle 100, additional computational resources can be utilized to focus on sensor data from the direction of concern indicated by the passenger.

Figure 6:
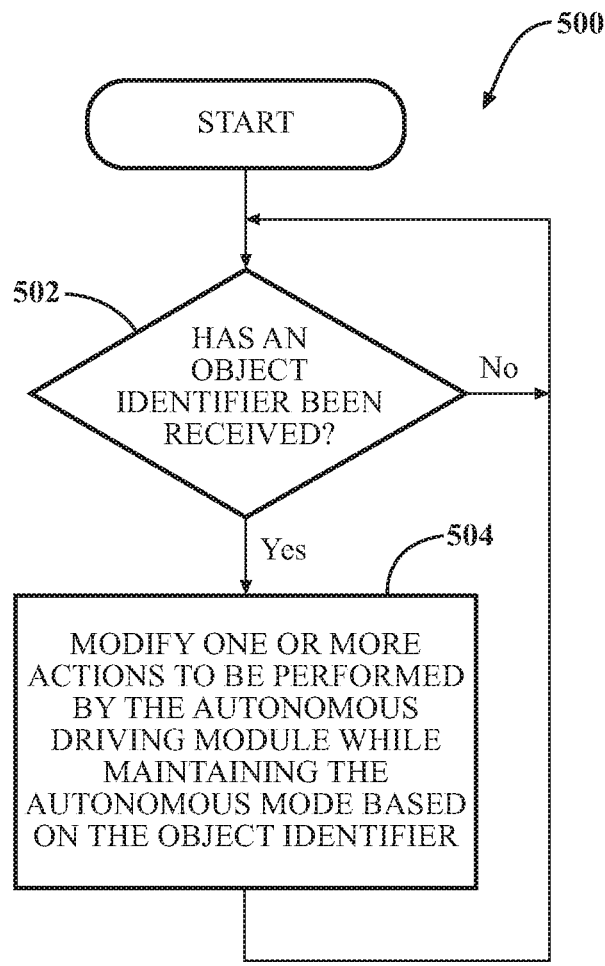
FIG. 6 illustrates yet another example of a method for modifying actions taken by the autonomous driving module of an autonomous vehicle using an object identifier input from a passenger.

Referring to FIG. 6, another method 500 for modifying actions taken by an autonomous driving module of an autonomous vehicle is shown. The method 500 will be described from the viewpoint of the vehicle 100 of FIG. 2 and the modifying system 170 of FIG. 3. However, it should be understood that this is just one example of implementing the method 500. While method 500 is discussed in combination with the modifying system 170, it should be appreciated that the method 500 is not limited to being implemented within the modifying system 170, but is instead one example of a system that may implement the method 500. Further, it should be understood that the method 500 may be combined with the method 300 and/or the method 400 previously described.

Here, the method 500 begins at step 502, wherein the input module 220 causes the processor(s) 110 to determine if an object identifier has been received. In one example, the object identifier may be an identifier indicating a pedestrian and a non-pedestrian. As such, for example, if the passenger of the vehicle 100 is concerned that the autonomous driving module 160 may pilot the vehicle 100 into an object, the passenger of the vehicle 100 can indicate the type of object that the passenger is concerned about. The passenger of the vehicle 100 may indicate the object identifier by using any one of the input device(s) 130. As such, the passenger could indicate by voice, touch, actuation, or otherwise some indication regarding the object identifier.

If an object identifier has been received, the method 500 proceeds to step 504. In step 504, the modification module 230 causes the processor(s) 110 to modify one or more actions performed by the autonomous driving module 160 based on the object identifier. As stated before, these actions could include things such as increasing the amount of sensor data considered by the autonomous driving module 160, reducing a present or future rate of acceleration, reducing a present or future velocity of the vehicle 100, and/or changing the steering angle of the vehicle 100.

Because greater caution should be practiced when a pedestrian is indicated in the object identifier, the amount of sensor data considered by the autonomous driving module 160 may be greater when the object identifier is the pedestrian than when the object identifier is the non-pedestrian. Similarly, the future or current rate of acceleration and/or velocity of the vehicle 100 may be reduced by a greater amount by the autonomous driving module 160 when the object identifier is the pedestrian than when the object identifier is the non-pedestrian.

FIG. 2 will now be discussed in full detail as an example environment within which the system and methods disclosed herein may operate. In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle 100 along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data stores 115, and/or another element of the vehicle 100 (including any of the elements shown in FIG. 2). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include one or more vehicle systems 140. Various examples of the one or more vehicle systems 140 are shown in FIG. 2. However, the vehicle 100 can include more, fewer, or different vehicle systems. It should be appreciated that although particular vehicle systems are separately defined, each or any of the systems or portions thereof may be otherwise combined or segregated via hardware, software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the modifying system 170, and/or the autonomous driving module(s) 160 can be operatively connected to communicate with the various vehicle systems 140 and/or individual components thereof. For example, returning to FIG. 2, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the modifying system 170, and/or the autonomous driving module(s) 160 may control some or all of these vehicle systems 140 and, thus, may be partially or fully autonomous.

The processor(s) 110, the modifying system 170, and/or the autonomous driving module(s) 160 can be operatively connected to communicate with the various vehicle systems 140 and/or individual components thereof. For example, returning to FIG. 2, the processor(s) 110, the modifying system 170, and/or the autonomous driving module(s) 160 can be in communication to send and/or receive information from the various vehicle systems 140 to control the movement, speed, maneuvering, heading, direction, etc. of the vehicle 100. The processor(s) 110, the modifying system 170, and/or the autonomous driving module(s) 160 may control some or all of these vehicle systems 140.

The processor(s) 110, the modifying system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the modifying system 170, and/or the autonomous driving module(s) 160 can control the direction and/or speed of the vehicle 100. The processor(s) 110, the modifying system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the modifying system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250. "Driving maneuver" means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims rather than to the foregoing specification, as indicating the scope hereof.

What is claimed is:

1. A system for modifying actions taken by an autonomous driving module of an autonomous vehicle, the system comprising:
    one or more processors;
        an input device, the input device receiving touch or voice input from a passenger and being in communication with the one or more processors; and
        a memory in communication with the one or more processors the memory including an input module and a modification module,
        wherein the input module includes instructions that when executed by the one or more processors cause the one or more processors to determine a heading indicated by the input of a passenger of the autonomous vehicle when the autonomous driving module is in an autonomous mode,
        wherein the modification module includes instructions that when executed by the one or more processors cause the one or more processors to modify one or more actions to be performed by the autonomous driving module while maintaining the autonomous mode of the autonomous driving module when a heading is indicated by the input of the passenger, wherein the one or more actions includes increasing an amount of sensor data from the heading indicated by the passenger from a sensor of a sensor system considered by the autonomous driving module to generate additional sensor data from the sensor and determining presence of errors in a subset of the sensor data indicated by the heading using the additional sensor data from the sensor, and
        wherein the autonomous driving module controls the driving of the vehicle based on the determined presence of errors.

2. The system of claim 1, wherein the one or more actions further includes at least one of:
    reducing a rate of acceleration of the autonomous vehicle,
    reducing a velocity of the autonomous vehicle; and
    changing a steering angle of the autonomous vehicle.

3. The system of claim 1, wherein:
    the input module further comprises instructions that when executed by the one or more processors cause the one or more processors to receive, via the input device, a direction from the passenger of the autonomous vehicle; and
    the modification module further comprises instructions that when executed by the one or more processors cause the one or more processors to increase the amount of sensor data considered by the autonomous driving module from the direction indicated by the passenger.

4. The system of claim 1, wherein the input module further comprises instructions that when executed by the one or more processors cause the one or more processors to receive, via the input device, an object identifier from the passenger of the autonomous vehicle, the object identifier is at least one of a pedestrian and a non-pedestrian.

5. The system of claim 4, wherein the modification module further comprises instructions that when executed by the one or more processors cause the one or more processors to modify one or more actions performed by the autonomous driving module based on the object identifier.

6. The system of claim 5, wherein an amount of sensor data considered by the autonomous driving module is greater when the object identifier is the pedestrian than when the object identifier is the non-pedestrian.

7. The system of claim 5, wherein a rate of acceleration of the autonomous vehicle is reduced by a greater amount by the autonomous driving module when the object identifier is the pedestrian than when the object identifier is the non-pedestrian.

8. The system of claim 5, wherein a velocity of the autonomous vehicle is reduced by a greater amount by the autonomous driving module when the object identifier is the pedestrian than when the object identifier is the non-pedestrian.

9. A method for modifying actions taken by an autonomous driving module of an autonomous vehicle, the method comprising the steps of:
    determining a heading received by a touch or voice input from a passenger of the autonomous vehicle when the autonomous driving module is in an autonomous mode;
    modifying one or more actions to be performed by the autonomous driving module while maintaining the autonomous mode of the autonomous driving module when a heading is indicated by the input of the passenger, wherein the one or more actions includes increasing an amount of sensor data from the heading indicated by the passenger from a sensor of a sensor system considered by the autonomous driving module to generate additional sensor data from the sensor;
    determining presence of errors in a subset of the sensor data indicated by the heading using the additional sensor data from the sensor; and
    Controlling the driving of the vehicle based on the determined presence of errors.

10. The method of claim 9, wherein the one or more actions further includes at least one of:
    reducing a rate of acceleration of the autonomous vehicle,
    reducing a velocity of the autonomous vehicle; and
    changing a steering angle of the autonomous vehicle.

11. The method of claim 9, further comprising the steps of:
    receiving, via the input device, a direction from the passenger of the autonomous vehicle; and increasing the amount of sensor data considered by the autonomous driving module from the direction indicated by the passenger.

12. The method of claim 9, further comprising the step of receiving, via the input device, an object identifier from the passenger of the autonomous vehicle, the object identifier is at least one of a pedestrian and a non-pedestrian.

13. The method of claim 12, wherein modifying one or more actions performed by the autonomous driving module is based on the object identifier.

14. The method of claim 13, wherein an amount of sensor data considered by the autonomous driving module is greater when the object identifier is the pedestrian than when the object identifier is the non-pedestrian.

15. The method of claim 13, wherein a rate of acceleration of the autonomous vehicle is reduced by a greater amount by the autonomous driving module when the object identifier is the pedestrian than when the object identifier is the non-pedestrian.

16. The method of claim 13, wherein a velocity of the autonomous vehicle is reduced by a greater amount by the autonomous driving module when the object identifier is the pedestrian than when the object identifier is the non-pedestrian.

17. A non-transitory computer-readable medium for modifying actions taken by an autonomous driving module of an autonomous vehicle, the non-transitory computer-readable medium comprising instructions that when executed by one or more processors cause the one or more processors to:
  determine a heading received by touch or voice input from a passenger of the autonomous vehicle when the autonomous driving module is in an autonomous mode;
  modify one or more actions to be performed by the autonomous driving module while maintaining the autonomous mode of the autonomous driving module when a heading is indicated by the input of the passenger, wherein the one or more actions includes increasing an amount of sensor data from the heading indicated by the passenger from a sensor of a sensor system considered by the autonomous driving module to generate additional sensor data from the sensor;
  determining presence of errors in a subset of the sensor data indicated by the heading using the additional sensor data from the sensor; and
  Control the driving of the vehicle based on the determined presence of errors.

18. The non-transitory computer-readable medium of claim 17, wherein the one or more actions include at least one of:
  reducing a rate of acceleration of the autonomous vehicle,
  reducing a velocity of the autonomous vehicle; and
  changing a steering angle of the autonomous vehicle.

19. The non-transitory computer-readable medium of claim 17, further comprising instructions that when executed by one or more processors cause the one or more processors to:
  receive, via the input device, a direction from the passenger of the autonomous vehicle; and
  increase the amount of sensor data considered by the autonomous driving module from the direction indicated by the passenger.

20. The non-transitory computer-readable medium of claim 17, further comprising instructions that when executed by one or more processors cause the one or more processors to:
  receive, via the input device, an object identifier from the passenger of the autonomous vehicle, the object identifier is at least one of a pedestrian and a non-pedestrian; and
  modify one or more actions performed by the autonomous driving module is based on the object identifier.

* * * * *